United States Patent
Tseng et al.

(10) Patent No.: US 11,692,618 B2
(45) Date of Patent: Jul. 4, 2023

(54) MECHANICAL DEVICE FOR MOVING TWO MACHINE PARTS TOWARD OR AWAY FROM EACH OTHER

(71) Applicant: TOYO AUTOMATION CO., LTD., Tainan (TW)

(72) Inventors: Kun-Cheng Tseng, Tainan (TW); Hsiang-Wei Chen, Tainan (TW); Lei Shih Shih, Tainan (TW)

(73) Assignee: Toyo Automation Co., Ltd., Tainan (TW)

( * ) Notice: Subject to any disclaimer, the term of this patent is extended or adjusted under 35 U.S.C. 154(b) by 2 days.

(21) Appl. No.: 17/653,679

(22) Filed: Mar. 7, 2022

(65) Prior Publication Data

US 2023/0122643 A1     Apr. 20, 2023

(30) Foreign Application Priority Data

Oct. 14, 2021 (TW) ................................ 110138189

(51) Int. Cl.
*F16H 37/12* (2006.01)
*F16H 1/22* (2006.01)

(52) U.S. Cl.
CPC ........... *F16H 37/124* (2013.01); *F16H 1/222* (2013.01); *F16H 1/22* (2013.01)

(58) Field of Classification Search
CPC ...... F16H 37/124; F16H 19/001; F16H 1/227; F16H 55/22; F16H 55/02; F16H 1/222
See application file for complete search history.

(56) References Cited

U.S. PATENT DOCUMENTS

| | | | | |
|---|---|---|---|---|
| 319,648 | A * | 6/1885 | Wegmann | F16H 1/22 74/438 |
| 2,428,128 | A * | 9/1947 | Sheppard | G05G 7/12 74/330 |
| 2002/0084656 | A1 * | 7/2002 | Lin | E05B 47/0012 292/159 |
| 2017/0150965 | A1 * | 6/2017 | Williams | A61B 17/1155 |
| 2020/0115932 | A1 * | 4/2020 | Ottino | E05B 81/01 |
| 2022/0090670 | A1 * | 3/2022 | Hassenbach | F16H 55/22 |

FOREIGN PATENT DOCUMENTS

CN     114183481 A *  3/2022  ........... F16H 37/124

* cited by examiner

*Primary Examiner* — Terence Boes
(74) *Attorney, Agent, or Firm* — Rosenberg, Klein & Lee

(57) ABSTRACT

A mechanical device includes a worm and two swing units disposed in a housing. Each swing unit has a pivot member and a swing member meshing with the worm. The swing member has an arcuate cam slot that has a first end and a second end. A rail is fixed to the housing above the swing units and the worm. Two sliders are connected to the swing units. Each slider has a slide block engaging the rail, an extension arm, and a protrusion protruding from the extension arm and inserted into the arcuate cam slot to slide between the first and second ends of the arcuate cam slot when the worm drives the swing member to swing.

8 Claims, 6 Drawing Sheets

MECHANICAL DEVICE FOR MOVING TWO MACHINE PARTS TOWARD OR AWAY FROM EACH OTHER

CROSS-REFERENCE TO RELATED APPLICATION

This application claims priority to Taiwanese Patent Application No. 110138189, filed on Oct. 14, 2021.

FIELD

The disclosure relates to a mechanical device for use in an automated manufacturing process, and more particularly to a mechanical device for moving two machine parts toward or away from each other. The machine parts may be two clamping parts movable toward or away from each other for clamping and unclamping an object.

BACKGROUND

With the advance of technology, most of manufacturing processes carried out manually in the past are replaced by automatic manufacturing processes using automated machines. However, since automated machines occupy relatively large spaces, they can lead to a shortage of workshop space. Specifically, for building a production line, due to limitations of the sequence of processing steps and workshop space, it may be hard to locate individual automated machines at proper places within a limited workshop space.

SUMMARY

Therefore, an object of the disclosure is to provide a mechanical device that is compact and simple in structure and that is capable of moving two machine parts toward or away from each other.

According to the disclosure, a mechanical device includes a housing, a drive unit, two swing units, a rail unit, and two sliders.

The housing defines an installation space.

The drive unit includes a motor positioned in the installation space and a worm connected to and rotated by the motor.

The swing units are respectively disposed on two opposite sides of the worm. Each of the swing units has a pivot member spaced apart from the worm and rotatably connected to the housing, and a swing member connected to the pivot member to swing around the pivot member. The swing member has a curved toothed portion disposed between the pivot member and the worm and meshing with the worm, and an arcuate cam slot formed between the curved toothed portion and the pivot member. The arcuate cam slot has a first end and a second end opposite to the first end.

The rail unit includes at least one rail fixed to the housing above the swing units and the drive unit.

The sliders are respectively connected to the swing units and configured to support the two machine parts, respectively. Each of the sliders has a slide block slidably engaging the at least one rail, an extension arm extending downward from the slide block toward the swing member, and a protrusion protruding from the extension arm. The protrusion is inserted into the arcuate cam slot of the swing member. The protrusion is slidable between the first and second ends of the arcuate cam slot of the swing member when the worm drives the swing member to swing.

The protrusion slides from the second end to the first end when the worm rotates in a first direction and from the first end to the second end when the worm rotates in a second direction.

When the protrusions of the sliders slide to the first ends of the arcuate cam slots, respectively, the slide blocks of the sliders are moved away from each other.

When the protrusions of the sliders slide to the second ends of the arcuate guiding recesses, respectively, the slide blocks of the sliders are moved toward each other.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
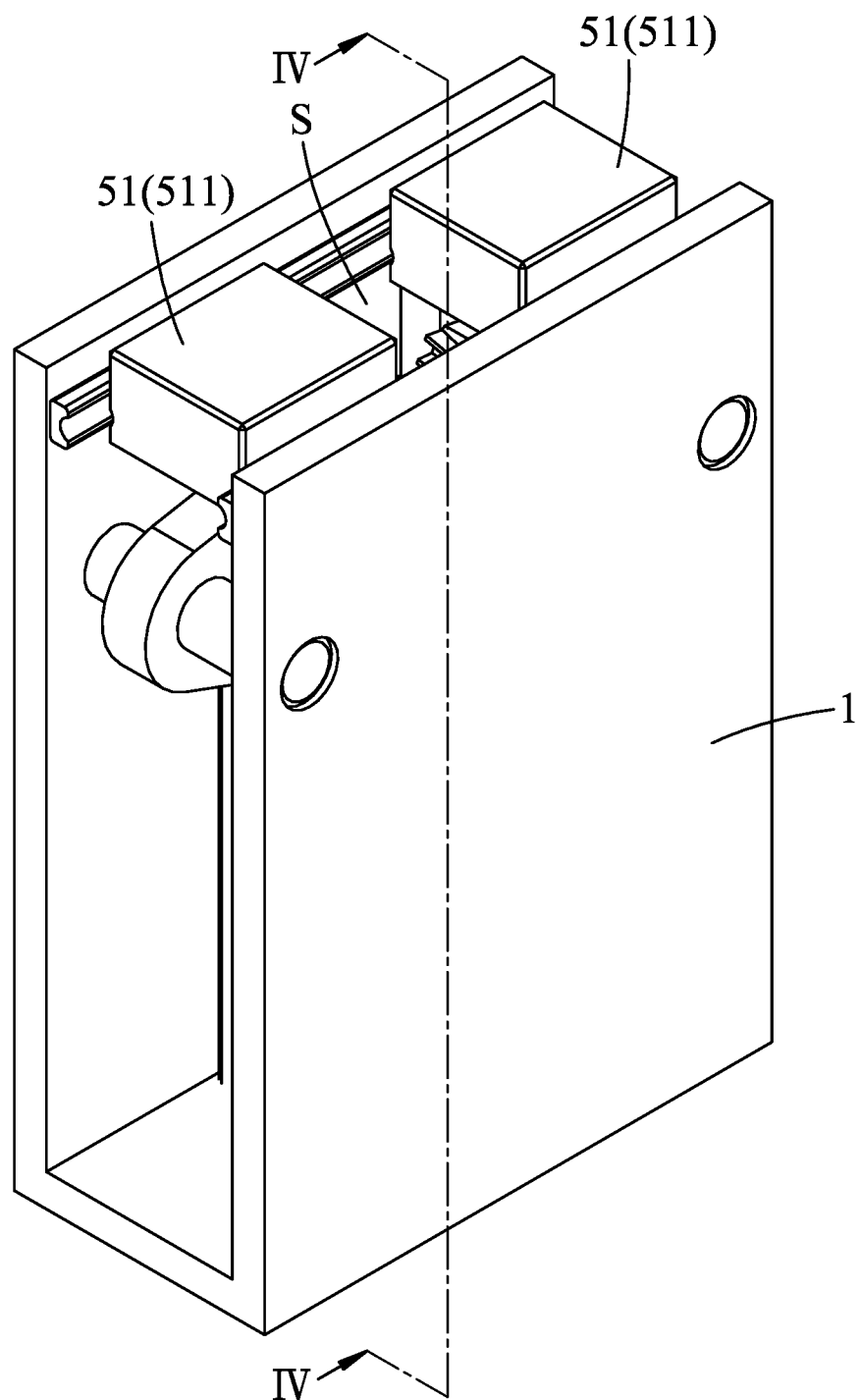
FIG. 1 is a perspective view illustrating a mechanical device according to an embodiment of the disclosure in an assembled state.
Figure 2:
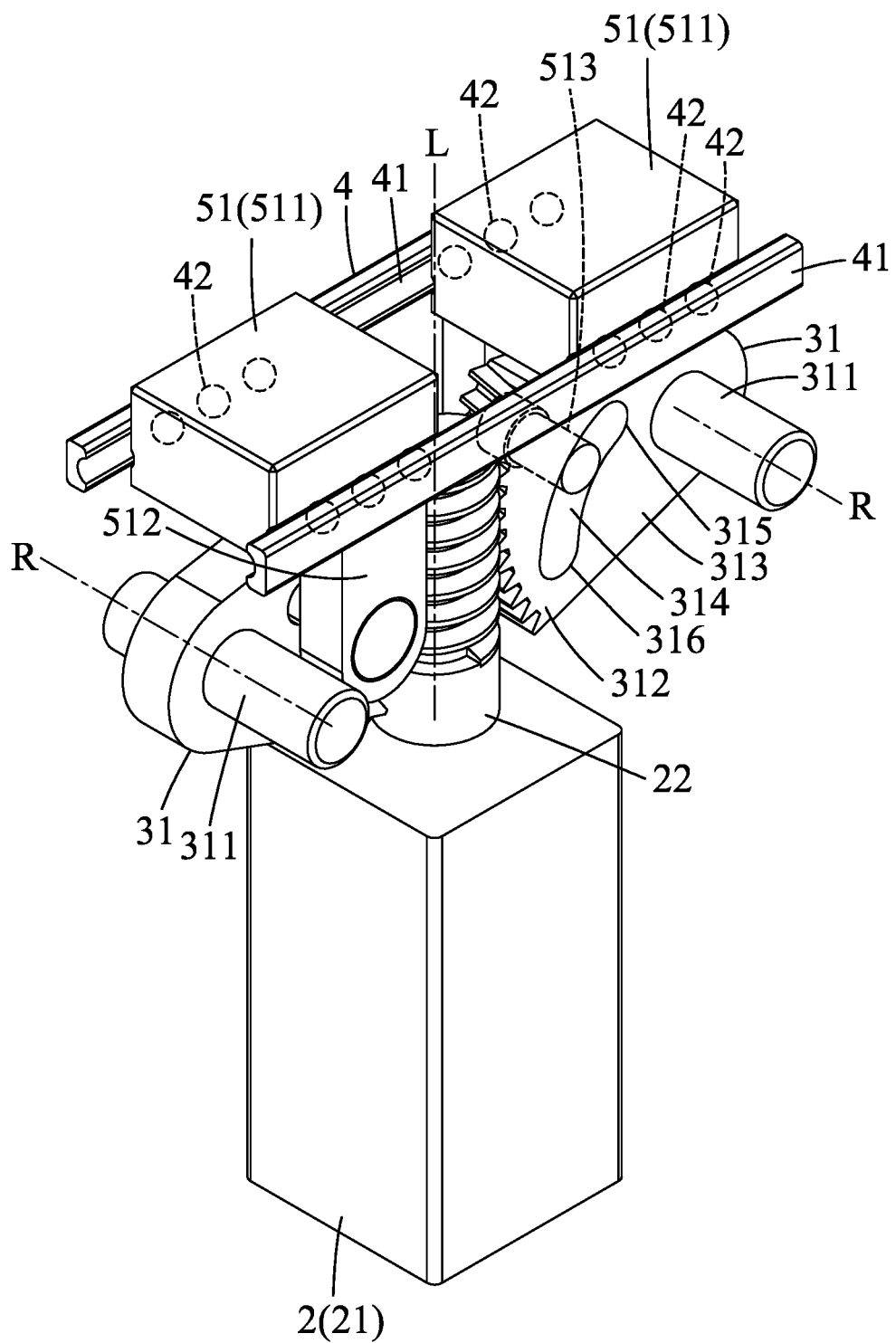
FIG. 2 is a perspective view of the embodiment illustrating a drive unit, two swing units, a rail unit, and two sliders of the mechanical device but omitting a housing.
Figure 3:
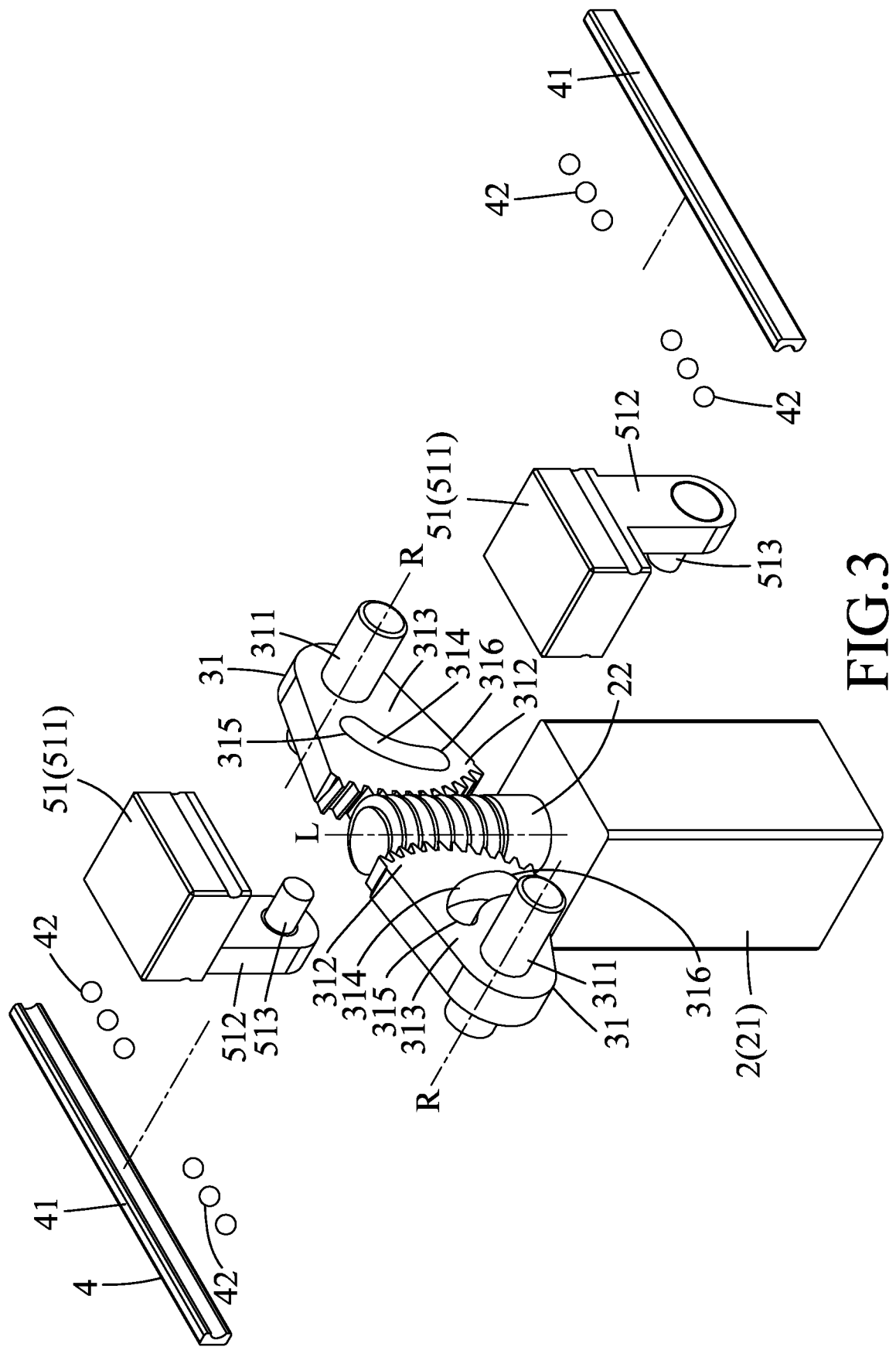
FIG. 3 is an exploded perspective view of the embodiment illustrating the drive unit, the two swing units, the rail unit, and the two sliders.

FIGS. 1 to 3 illustrate a mechanical device according to an embodiment of the disclosure for moving two machine parts toward or away from each other. The two machine parts may be two clamping parts (not shown) for clamping and unclamping an object. The mechanical device includes a housing 1, a drive unit 2, two swing units 31, a rail unit 4, and two sliders 51.

Figure 4:
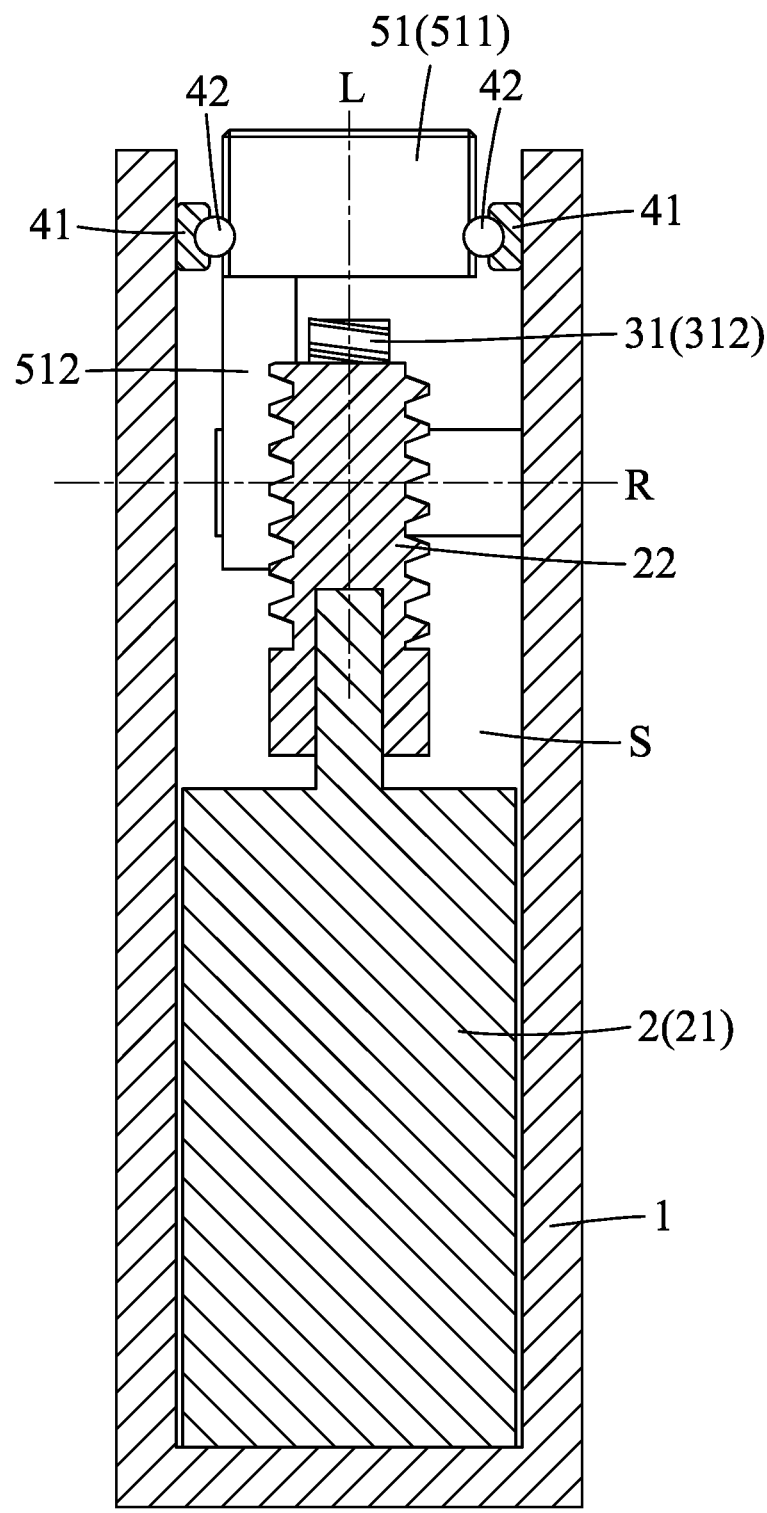
FIG. 4 is a sectional view taken along line IV-IV from FIG. 1.

As shown in FIG. 4, the housing 1 defines an installation space (S).

The drive unit 2 includes a motor 21 positioned in the installation space (S) and a worm 22 connected to and rotated by the motor 21. The worm 22 extends along and is rotatable about a worm axial line (L).

The swing units 31 are respectively disposed on two opposite sides of the worm 22. Each of the swing units 31 has a pivot member 311 spaced apart from the worm 22 and rotatably connected to the housing 1, and a swing member 313 connected to the pivot member 311 to swing around the pivot member 311. The swing member 313 has a curved toothed portion 312 disposed between the pivot member 311 and the worm 22 and meshing with the worm 22, and an arcuate cam slot 314 formed between the curved toothed portion 312 and the pivot member 311. The arcuate cam slot 314 has a first end 315 and a second end 316 opposite to the first end 315. The first end 315 is at a level higher than the second end 316. A distance of the first end 315 of the arcuate cam slot 314 from the pivot member 311 is smaller than that from the toothed portion 312. A distance of the second end 316 of the arcuate cam slot 314 from the pivot member 311 is larger than that from the toothed portion 312. The arcuate cam slot 314 has a convexed side facing the toothed portion 312 and a concaved side facing the pivot member 311.

In this embodiment, each of the swing units 31 has a shape of a sector and has an apex region where the pivot member 311 is disposed, and a curved outer periphery where the toothed portion 312 is formed. Such a design is advantageous in that the toothed portions 312 of the swing units 31 can effectively mesh with the worm 22 and has a compact size to reduce the space occupied by the swing units 31. Further, the pivot member 311 of each of the swing units 31 is rotatable about a pivot axis (R) perpendicular to the worm axial line (L) so that the swing units 31 are swingable on a plane coplanar with the worm axial line (L), thereby reducing the space occupied by the swing units 31. Furthermore, in this embodiment, the arcuate cam slot 314 extends through the swing member 313 in a direction parallel with the pivot axis (R) and thus opens at two opposite surfaces of the swing member 313. However, in other embodiments, the arcuate cam slots 314 of the swing units 31 open only at one of two opposite surfaces of the swing member 313.

The rail unit 4 includes two rails 41 and a plurality of rolling balls 42. The rails 41 are fixed to the housing 1 above the swing units 31 and the drive unit 2. The worm 22 is perpendicular to the rails 41.

The two sliders 51 are respectively connected to the swing units 31 and configured to support the two machine parts, respectively. Each of the slider 51 has a slide block 511 disposed between and slidably engaging the rails 41, an extension arm 512 extending downward from the slide block 511 toward the swing member 313, and a protrusion 513 protruding from the extension arm 512. The protrusion 513 is inserted into the arcuate cam slot 314 of the swing member 313 of a corresponding one of the swing units 31. The protrusion 513 is slidable between the first and second ends 315, 316 of the arcuate cam slot 314 of the swing member 313 of the corresponding one of the swing units 31 when the worm 22 drives the swing member 313 to swing.

The rolling balls 42 of the rail unit 4 are disposed between the slide block 511 of each of the sliders 51 and each of the rails 41 so as to enhance the smoothly sliding movement of the slide bock 511 with respect to the rails 41 and increase the service life of the slide block 511 and the rails 41. However, the rolling balls 42 can be omitted, and the mechanical device of the disclosure is not limited to inclusion of the rolling balls 42. Further, the number of the rails 41 can be one for engagement of the slide blocks 511 of the two sliders 51.

Figure 5:
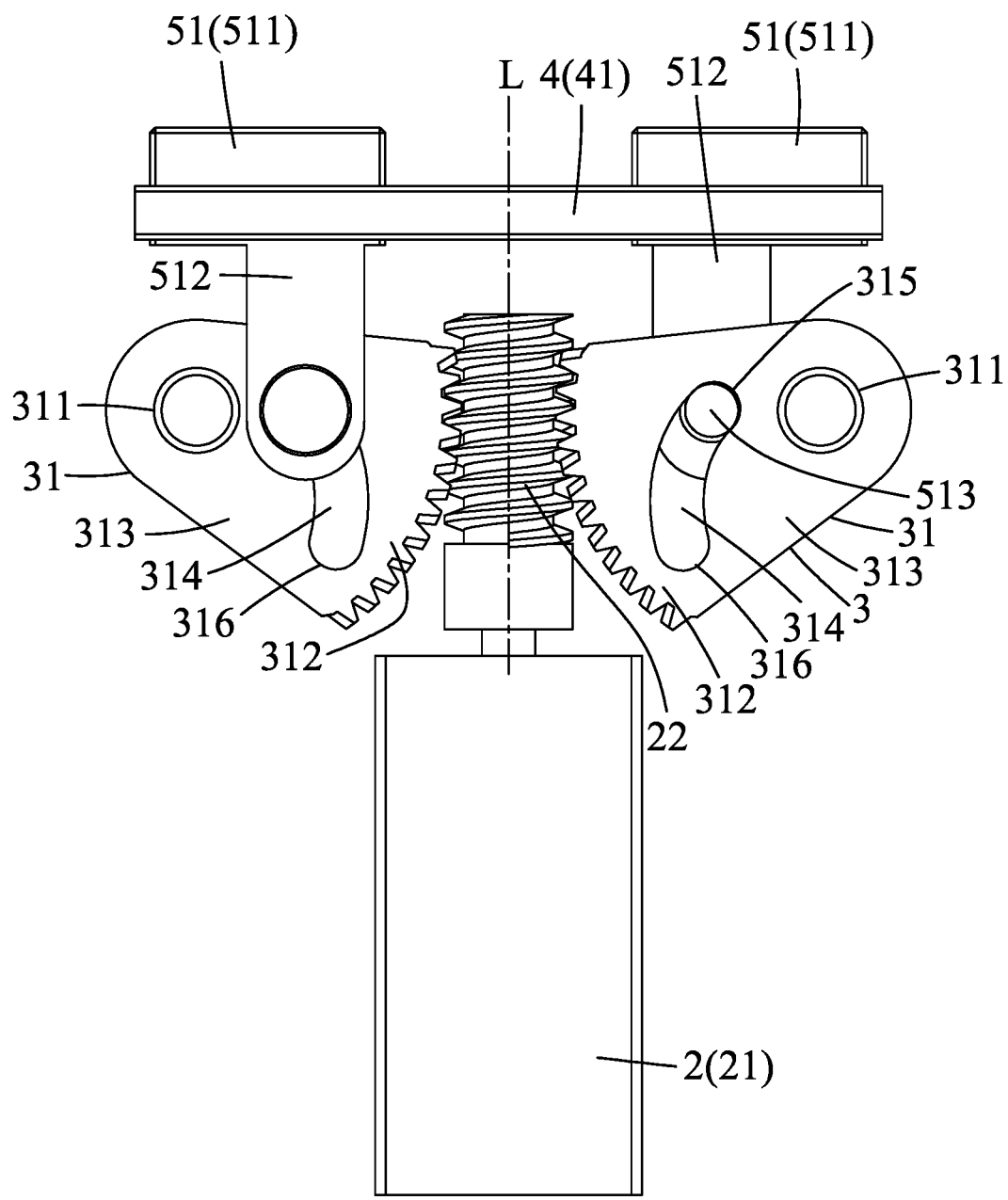
FIG. 5 is a side view of the embodiment illustrating the two sliders being moved away from each other.
Figure 6:
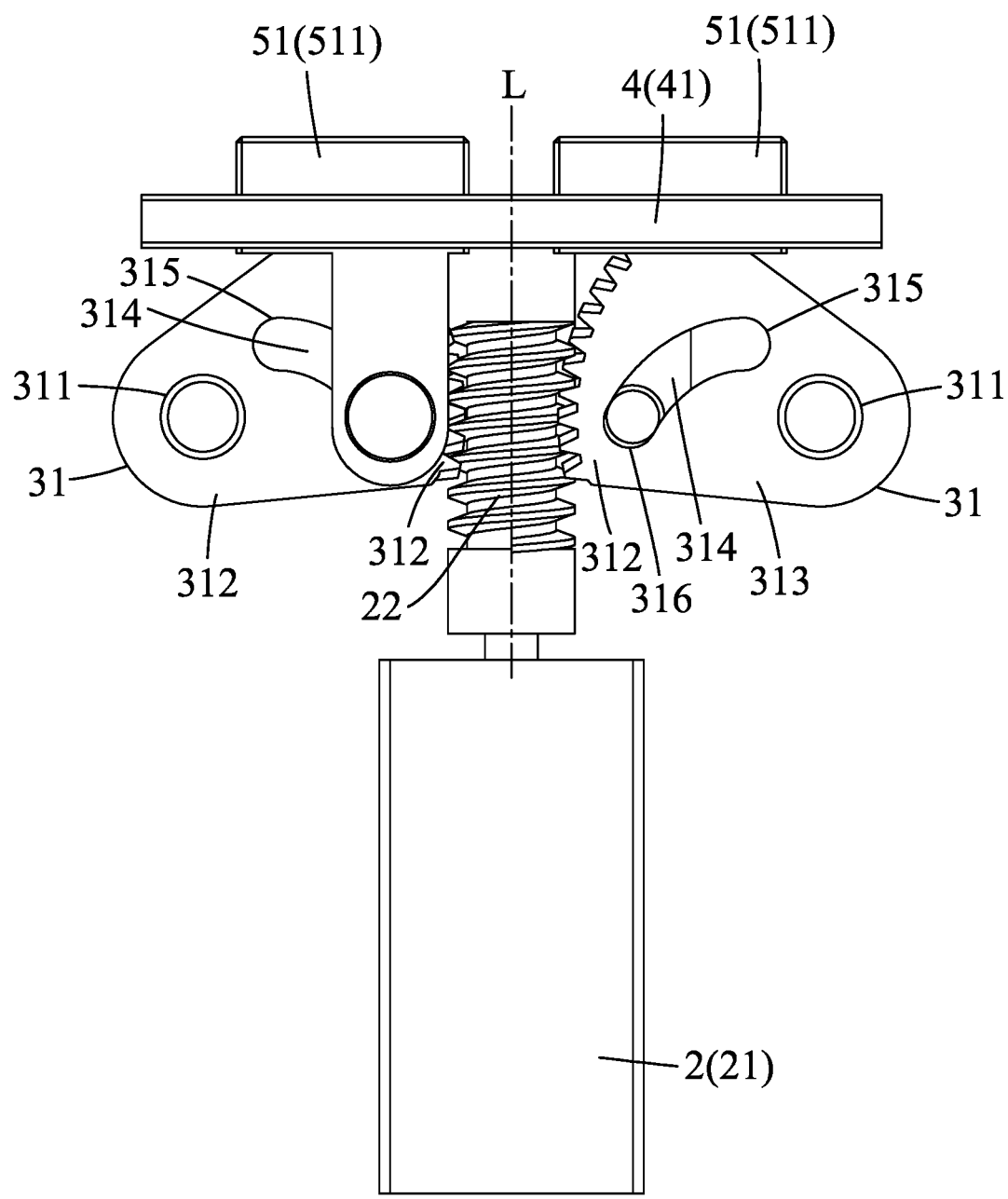
FIG. 6 is a view similar to FIG. 5, but illustrating the two sliders being moved toward each other.

Because the worm 22, through the curved toothed portion 312, drives the swing member 313 to swing around the pivot member 311, and because the protrusion 513 of a corresponding one of the sliders 51 is inserted into the arcuate cam slot 314, the slide block 511 of the corresponding one of the sliders 51 is moved by the swing movement of the swing member 313 to slide with respect to the rails 41. Referring to FIGS. 5 and 6, the protrusion 513 slides from the second end 316 to the first end 315 when the worm 22 driven by the motor 21 rotates in a first direction and from the first end 315 to the second end 316 when the worm 22 driven by the motor 21 rotates in a second direction. As shown in FIG. 5, when the protrusions 513 of the sliders 51 slide to the first ends 315 of the arcuate cam slots 314, respectively, the slide blocks 511 of the sliders 51 are moved away from each other. As shown in FIG. 6, when the protrusions 513 of the sliders 51 slide to the second ends 316 of the arcuate guiding recesses 314, respectively, the slide blocks 511 of the sliders 51 are moved toward each other.

Noteworthily, for each of the swing units 31, the toothed portion 312 of the swing member 313 is always situated between the pivot member 311 and the worm 22 during movements of the sliders 51; the swing units 31 swing within an angle less than 90° when the protrusions 513 of the sliders 51 slide in the arcuate cam slots 314 of the swing units 31, respectively. The swing units 31 do not rotate outward and thus need not occupy the spaces at the outsides of the two pivot members 311.

The protrusions 513 of the sliders 51 have central axes extending in a direction parallel to the pivot axes (R) of the pivot members 311 of the swing units 31, and move along a moving path parallel to the rails 41 when being guided to slide respectively in the arcuate cam slots 314 of the swing units 31. Besides, the pivot axes (R) of the pivot members 311 and the central axes of the protrusions 513 are constantly kept on a common plane parallel with the rails 41 when the protrusions 513 slide in the respective arcuate cam slots 314. With such a structural design, the mechanical device of the disclosure can be simple, have compact size, and can stabilize the movement speed and output force of the sliders 51 to ease control during use.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A mechanical device adapted to move two machine parts toward or away from each other, comprising:
   a housing defining an installation space;
   a drive unit including a motor positioned in said installation space and a worm connected to and rotated by said motor;
   two swing units respectively disposed on two opposite sides of said worm, each of said swing units having a pivot member spaced apart from said worm and rotatably connected to said housing, and a swing member connected to said pivot member to swing around said pivot member, said swing member having a curved toothed portion disposed between said pivot member and said worm and meshing with said worm, and an arcuate cam slot formed between said curved toothed portion and said pivot member, said arcuate cam slot having a first end and a second end opposite to said first end;
   a rail unit including at least one rail fixed to said housing above said swing units and said drive unit; and two sliders respectively connected to said swing units and configured to support the two machine parts, respectively, each of said sliders having a slide block slidably engaging said at least one rail, an extension arm extending downward from said slide block toward said swing member, and a protrusion protruding from said extension arm, said protrusion being inserted into said arcuate cam slot of said swing member, said protrusion being slidable between said first and second ends of said arcuate cam slot of said swing member when said worm drives said swing member to swing;

wherein said protrusion slides from said second end to said first end when said worm rotates in a first direction and from said first end to said second end when said worm rotates in a second direction;

wherein, when said protrusions of said sliders slide to said first ends of said arcuate cam slots, respectively, said slide blocks of said sliders are moved away from each other; and wherein, when said protrusions of said sliders slide to said second ends of said arcuate guiding recesses, respectively, said slide blocks of said sliders are moved toward each other.

2. The mechanical device as claimed in claim 1, wherein, for each of said swing units, said toothed portion of said swing member is always situated between said pivot member and said worm during movements of said sliders.

3. The mechanical device as claimed in claim 2, wherein said swing units swing within an angle less than 90° when said protrusions of said sliders slide in said arcuate cam slots of said swing units, respectively.

4. The mechanical mechanical device as claimed in claim 1, wherein each of said swing units has a shape of a sector and has an apex region where said pivot member is disposed, and an outer periphery where said toothed portion is formed.

5. The mechanical device as claimed in claim 4, wherein said protrusions of said sliders have central axes extending in a direction parallel to the pivot axes of said pivot members of said swing units, and move along a moving path parallel to said at least one rail when sliding in said arcuate cam slots of said swing units, respectively, the pivot axes of said pivot members and the central axes of said protrusions being kept constantly on a common plane parallel with said at least one rail when the protrusions respectively slide in said arcuate cam slots.

6. The mechanical device as claimed in claim 1, wherein said worm is rotatable about a worm axial line which is perpendicular to said at least one rail 41, said pivot member of each of said swing units being rotatable about a pivot axis perpendicular to the worm axial line.

7. The mechanical device as claimed in claim 1, wherein:
said at least one rail includes two rails, said slide blocks of said sliders disposed between said rails; and
said rail unit further includes a plurality of rolling balls disposed between said slide block of each of said sliders and each of said rails.

8. The mechanical device as claimed in claim 1, wherein said first end of said arcuate cam slot is at a level higher than said second end, a distance of said first end of said arcuate cam slot from said pivot member is smaller than that from said toothed portion, a distance of said second end of said arcuate cam slot from said pivot member is larger than that from said toothed portion, said arcuate cam slot having a convexed side facing said toothed portion and a concaved side facing said pivot member.

* * * * *